June 25, 1957 R. STUART-WILLIAMS 2,797,265
PULSE AMPLIFIER
Filed March 31, 1953
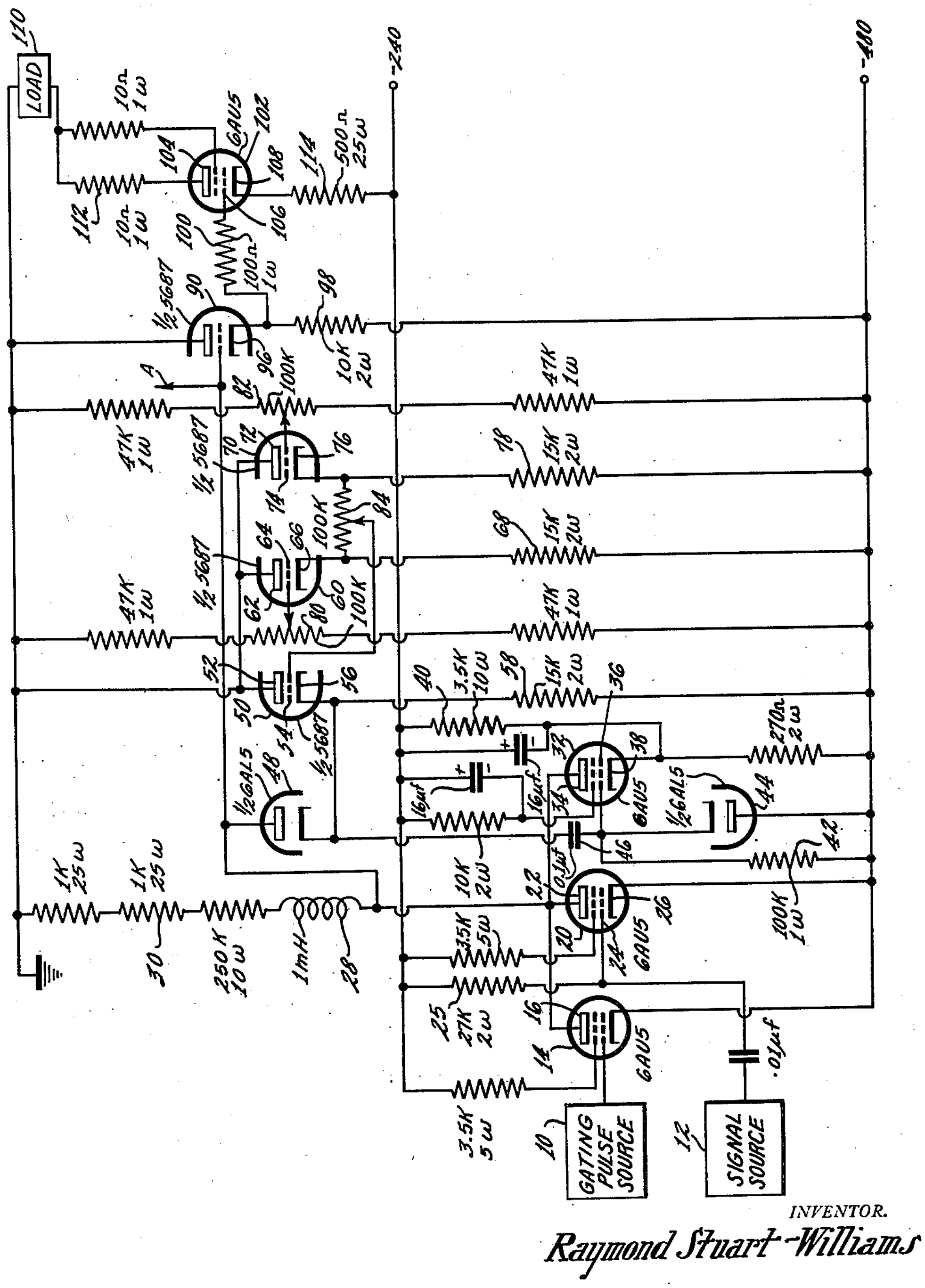
INVENTOR.
Raymond Stuart-Williams
BY Samuel Lindenberg
ATTORNEY United States Patent Office 2,797,265
Patented June 25, 1957

2,797,265

PULSE AMPLIFIER

Raymond Stuart-Williams, Princeton, N. J., assignor to Radio Corporation of America, a corporation of Delaware Application March 31, 1953, Serial No. 345,824

12 Claims. (Cl. 179—171)

This invention relates to electronic amplifiers and more particularly to an improvement in an electronic amplifier system.

In the computer field, a great deal of work is being done on the employment of memory devices which are made of solid materials. One of the most promising is a memory device which consists of a large number of magnetic cores capable of storing binary information as the polarity of magnetization of the core. These magnetic cores are driven from one polarity of magnetization to the opposite polarity of magnetization as dictated by the information to be stored or read out from the memory.

A description of a magnetic memory may be found in (1) Jay W. Forrester article in Journal of Applied Physics, January 1951, page 44, entitled "Digital Information Storage in Three Dimensions Using Magnetic Cores," and (2) Jan. A. Rajchman article in RCA Review, June 1952, entitled, "Static Magnetic Matrix Memory and Switching Circuits."

To save copper and to facilitate both the manufacture and operation of these memories, a minimum of winding turns are used on each core. To achieve the force needed in order to drive a magnetic core from one polarity to the opposite polarity, a current of high intensity is required. Magnetic memory cores made of ferrospinel material have gained favor. These materials can be driven from one polarity of magnetization to the opposite polarity in a period of a microsecond or less. This requires that not only must a short pulse be applied to take advantage of the fast turnover of these cores, but also that the required driving current amplitude should be established very rapidly. This current pulse must rise smoothly within hundredths of a microsecond to the desired current value and that current value must be maintained for tenths of a microsecond without variation. The fall or trailing edge of the pulse should be extremely rapid also. These requirements are extremely stringent and the presently known types of amplification systems do not readily provide an output current pulse which meets with these requirements.

In driving a magnetic memory, a number of amplifiers are employed, which must rise and fall simultaneously as they are driven. Furthermore, the amplitude of each current pulse provided by each of these amplifiers should be variable over a reasonably large range independently, or from a single master control. A feature of the present invention is an amplification system which provides an output current which meets the above mentioned stringent current pulse requirements.

A further feature of this invention is an amplifier which permits a variation of the current pulse amplitude over a large range.

A further feature of the present invention is an amplification system which provides a current pulse output wherein the plateau of the pulse is maintained level during the entire pulse duration.

The present invention comprises an amplifier system wherein a control tube has an inductive load connected to its plate circuit and a capacitive load also connected thereto. The capacitive load includes a Miller integrator with a diode in the feedback circuit between the plate and the control grid. The feedback diode is biased so that the integrator is not a load in the output circuit of the control tube until the plate voltage of the control tube exceeds the biasing voltage of the diode. The control tube is normally conducting very heavily. When a negative signal is applied to its control grid, the voltage at the plate begins to rise up and is considerably assisted in this rise by the effect of the inductance in the plate circuit. However, when the control tube plate voltage exceeds the bias applied to the diode in the Miller integrator circuit, the output voltage at this point is clamped, since the diode begins to conduct. The effect of the Miller integrator circuit is as if a large capacitance were connected to the plate circuit of the tube and this prevents ringing due to the presence of the inductance. The output from the control tube anode is applied through a cathode follower to a normally non-conducting output tube. The load is connected in series with the plate circuit of the output tube. The rise time of the output pulse is extremely rapid due to the effect of the inductance assisting the rise of the plate voltage of the control tube. When the pulse subsides, the control tube rapidly begins to draw current and the effect of the inductance is to assist in the drop of its anode voltage. At the point at which the diode becomes cut off, the Miller integrator circuit no longer serves as a capacity load on the control tube anode and the effect of the inductance to assist the drop of the plate voltage as the tube draws more current is permitted to a greater extent. The output current or the level at which the output of the control tube is clamped is readily adjusted by controlling the bias applied to the cathode of the diode.

The novel features of the invention, as well as the invention itself, both as to its organization and method of operation, will best be understood from the following description when read in connection with the accompanying drawings, in which the figure in the drawing shows a circuit diagram of a preferred embodiment of the invention.

Referring to the circuit diagram, a gating pulse source 10 and a signal pulse source 12 are respectively coupled to the grid of a gate tube 14 and to the grid 24 of a control tube 20. These pulse sources may be any well known controllable source of pulses. The anodes 16, 22 of the gate tube and the control tube are connected together. In the control tube 20 anode circuit there is also an inductance 28 or an inductive anode load, in series with a resistive load 30 connected to a terminal to which is applied a fixed reference potential. The screen grids of the gate tube and control tube are connected through resistors to a screen grid voltage supply. The cathode 26 of the control tube is connected through a terminal to a potential source which is below the potential which is applied to its control grid 24. The control grid 24 receives its potential through a biasing resistor 25. Accordingly, in the standby condition, the control tube 20 is made to conduct very heavily. The gate tube 14 is biased to be normally non-conductive.

An integrator tube 32, which is an amplifying device, has its anode 34 connected to the anode 22 of the control tube, its screen grid connected to a screen grid supply, its cathode 38 connected to a voltage divider 40 which provides cathode bias and its control grid 36 connected to a negative voltage source through a grid leak resistor 42. The potentials are applied to this tube so that the cathode is more positive than the grid and the tube is therefore not conducting in the standby period. The control grid 36 of the integrator tube is also connected to the negative supply source via a diode 44 which is arranged to have its anode connected to the negative supply source and its cathode connected to the control grid. The control grid 36 of the integrator tube is also connected to a condenser 46 which in turn is connected to the cathode of a diode 48. This is a feedback diode 48 and its anode is connected to the anode 34 of the integrator tube 32.

Means are provided for applying a bias to the feedback diode which include a cathode follower tube 50 having a cathode load resistance 58 connected between its cathode 56 and the negative terminal of the supply source. Two biasing tubes 60, 70 have their anodes 62, 72 connected to the anode 52 of the cathode follower 50. The biasing tubes 60, 70 also each have a cathode load resistor 68, 78 connected between their respective cathodes and the negative potential supply. The grids 64, 74 of these two biasing tubes have biasing voltages applied thereto by means of two potentiometric devices 80, 82 which are connected across the source of operating potential. A potentiometer 84 has its fixed resistor connected between the cathodes 66, 76 of the two biasing diodes and the potentiometer 84 slider arm connected to the grid 54 of the cathode follower. Thus, adjustment of the potentiometric devices 80, 82 and the potentiometer 84 permit a range of bias values from which a selection may be made.

Output from the control tube 20 is applied to the grid of an output cathode follower 90. This output cathode follower tube 90 also has a cathode load resistor 98 connected to its cathode 96. A resistor 100 serves to couple the cathode 96 of the cathode follower 90 to the grid 106 of a final output tube 102. A D. C. 110 which is to be supplied with a current pulse, is connected in the plate circuit of this final output tube 102. Also connected in its plate circuit is a limiting resistance 112. The cathode 108, of the final output tube 102 has a cathode load resistor 114 connected thereto.

The values shown for the various circuit components and for the potential busses are those for an embodiment of the invention which was actually constructed and found to operate satisfactorily. The reason that the negative potentials were selected was that it was desired that the output be negative with respect to ground. These circuit values and negative operating potentials are not to be construed as a limitation upon the invention. Obviously, it is well within the ability of those skilled in the art to vary both the operating potential and the circuit components and their values and still be within the spirit of the invention described and claimed herein.

The operation of the amplification system is as follows: At the outset, consider that the gating pulse source 10 connected to the gating tube control grid provides a negative potential which maintains this tube 14 cut off. The control tube 20, as previously stated, is biased so that in the standby condition it is conducting very heavily. The potentiometric devices 80, 82 which apply bias to the control grids of the biasing tubes 60, 70 are respectively positioned so that one tube has its cathode at one extreme of the desired biasing range and the other tube has its cathode at the other extreme of the desired biasing range. This permits variation of the current drawn through the cathode follower 50 so that the clamping potential of the feedback diode 48 connected to the cathode follower cathode may be varied as desired. The output cathode follower 90, by virtue of the fact that its control grid is connected to the anode of the heavily conducting control tube 20, is substantially at cut-off and hence the voltage applied to the control grid of the output tube 102 is sufficient to maintain that tube cut off.

The signal applied to the control tube from the signal source 12 is a negative pulse which is to be amplified. The control tube 20 immediately begins to reduce its conduction in response to this negative input pulse. As the current through the tube drops, the voltage at its plate begins to rise. The inductive load 28 connected into the plate circuit is selected to have a large value of inductance and to have as low a self-capacitive reactance as possible. As the current supplied to this inductance is cut off, it functions in a manner to continue to supply current to the tube 20. This results in the potential at the anode 22 of the control tube 20 rising very rapidly. If no other circuits were connected to this anode 22, the potential would rise to a value of several kilovolts. When the plate voltage of the control tube 20 rises to a value above the bias voltage applied to the cathode of the diode 48, the diode begins to conduct and this conduction clamps the upper level of the output of the control tube. It will be seen that when this diode 48 conducts, voltage is applied through the capacitance 46 connected to the diode 48 to the grid 36 of the integrator tube 32. Thus the diode serves to start the integrator tube 32 conducting when the plate voltage of the control tube 20 exceeds the biasing voltage of the feedback diode 48.

As the integrator tube 32 commences to conduct, responsive to the effect of the voltage fed thereto through the feedback diode 48 and the feedback condenser 46, the integrator tube and its associated circuitry behave exactly like a Miller integrator. The Miller integrator circuit and its actions are described many places. For example, see "Waveforms" by Chance and others, vol. 19 of the M. I. T. Radiation Laboratories Series, published by McGraw-Hill Co., p. 37 and p. 664. It is well known that under these conditions the plate circuit of the integrator tube 32 presents a capacitive impedance which is many times the value of the feedback capacitance 46. Hence, as the diode 48 conducts, the capacitive impedance of the Miller integrator is introduced into the plate circuit of the control tube 20. The introduction of this impedance clamps the potential of the control tube plate 22 to a few volts higher than the potential at the cathode of the cathode follower 50, which is essentially the potential at the grid 54 of the cathode follower 50. Since the clamping is capacitive in character, it is not possible for any ringing or other disturbances to occur as a result of the presence of the inductive load and therefore the top of the pulse which is derived from the plate of the control tube 20 is perfectly smooth and flat.

This resultant limited pulse is applied through the cathode follower output tube 90 to the grid of the final output tube 102. There the cathode load 114 provides degeneration which increases the impedance of the plate circuit and also insures that the output current is proportional to the plate voltage of the control tube 20.

When the pulse applied to the control tube grid 24 terminates, the control tube 20 commences to conduct again. This initiation of conduction causes the voltage at the plate of the tube 20 to be reduced. As this voltage at plate 22 drops through the biasing potential point of the diode 48, the integrator tube 32 ceases to conduct. The cessation of conduction of the integrator tube 32 is accelerated by the fact that its own plate voltage is dropping along with the plate voltage of the control tube 20. The action of the inductance 28 is to apply voltage in a direction to increase the decrease in anode potential of the control tube 20. Stated in a different manner, when the current through the inductance begins to increase, the inductance provides a voltage which tends to oppose this increased current flow, which voltage assists in driving the anode of the control tube down.

Accordingly, the output cathode follower 90 and final output tube 102 resume their standby condition very rapidly with the very rapid dropping of the anode potential of the control tube. The voltage at the junction of the anodes of the control tube 20 and integrator tube 32 soon reaches a point at which the voltage is insufficient for the integrator tube 32 to conduct. The decrease of voltage at the anode junction is fed through the low impedance of the feedback diode 48 so long as the latter continues to conduct, and this feed through aids in decreasing conduction of the integrator tube 32. The conduction of the integrator tube 32 therefore quickly ceases, in effect removing the capacitive damping on the inductance 28, thus permitting still more rapid dropping of the voltage at this anode junction point. The cathodes of the feedback diode 48 and the cathode follower 50 may not fall to their standby level at once, since the feedback condenser 46 has become charged as a result of the integration operation. However, a rapid discharge for this condenser 46 is provided in the path provided by the cathode load resistance 58 of the cathode follower 50 and also the path of the diode 44 connected between the control grid 36 of the integrator tube 32 and the other terminal of the cathode load resistance.

The purpose of the gating tube 14 will now be explained. If it is desired that the circuit remain inactive despite the application of pulses to be amplified, a positive pulse is applied to the grid of the gate tube 14. This positive pulse causes the gate tube 14 to draw heavy current. Since its anode 16 is connected to the anode 22 of the control tube 20, the anode load is common to both tubes 14 and 20 and accordingly the potential at the anode of the control tube 20 will remain low regardless of the application of any signals to the grid 24 of the control tube 20. Alternatively, the gate tube 14 may be biased to be conducting in the standby period. A negative pulse can be delivered to the gate tube 14 from the pulse source 10 to cut off the tube 14 when an output from the amplifier is required. This gating action is of value where it is desired, during a certain interval, to maintain the particular amplifier quiescent regardless of the signals applied from another source.

Where it is desired to provide a number of amplifiers with the signal from the control tube 20, these amplifiers can be connected to the grid of the output cathode followers at the terminal designated with the letter A. Of course, as many output cathode followers and output tubes as are desired may be connected in parallel at this point.

When the gating tube 14 is employed, the amplifier may be designed to permit a time lag between the application of a negative signal to the input terminal and the time when the output cathode follower 90 causes the output tube 102 to start conducting. This may be arranged by the amount of bias, required to be overcome, which is applied to the output tube 102 to maintain it cut off. This is not a limitation, however, since, as is well known, this may be varied to suit the desired operation. Since the control tube anode 22 potential rises at a finite rate, some time elapses until the output tube 102 commences to conduct. In general, this delay is not too important provided it is constant and can be determined accurately. This rise is the first small portion of a sine wave, the frequency of which is determined by the inductance and the stray capacitance of the system. Hence, this delay may be very accurately timed and may be adjusted, if desired, by adding a small variable capacitor (not shown), between the plate 22 of the control tube 20 and ground. If, in a particular application, the gating tube 14 is not required, then the plate voltage of the control tube 20 as well as the bias voltage of the output tube 102 may be arranged so that the output tube 102 can start conducting substantially simultaneously with the rise in the voltage of the control tube plate 22.

A change in the output current may be very readily obtained by varying the sliding arm of the potentiometer 84. As previously stated, the range of voltage available for biasing the diode 48 is set by the cathode potentials selected at the extremes of the fixed resistor of the potentiometer 84. Preferably, the potentiometric device 80 is set so that, with the slider of potentiometer 84 at the cathode 66 of the first bias tube 60, only a few milliamperes or less of current are delivered to the load 110. The range of conduction available to all the amplifiers together is then controlled by the setting of potentiometric device 82. The setting of the slider of potentiometer 84 determines the response of all the amplifiers together within that range, in the same manner as this last setting determines the response of the amplifier comprising cathode follower 90 and final output tube 102.

This amplification system has usage in applications which do not require a rectangular current pulse. This may be seen if the grid 54 of the cathode follower 50, which provides the biasing voltage for the diode 48, is fed with a wave form other than D. C. The output pulse can then have an amplitude which is modulated linearly with respect to the wave form fed to the cathode follower grid 54. The resistor 30 which is in series with the inductance in the plate circuit of the control tube can be omitted and the upper terminal of the inductance 28 (as viewed in the drawing) can be connected to the −240 volt bus. If this is done it is not necessary to have the control tube 20 conducting at all times, as the control tube may be made to conduct a few microseconds before its operation is required. In short, the invention herein provides an amplification system wherein a large inductance in the plate circuit of an amplifier assists in the change in the plate voltage. A large capacitive load is also applied when the plate voltage of the control tube exceeds a predetermined level. The capacitance of this capacitive load serves to prevent the ringing usually attendant upon sudden changes in current through an inductance. The feedback diode serves to determine or clamp the level of the plateau or top of the output wave form as the value determined by the biasing means which is connected to its cathode. Thus the amount of current fed during a given time interval can be determined.

There has been described hereinabove an amplifier suitable for providing to a load large values of current having a substantially rectangular wave form with exceedingly rapid rise times and fall times and an exceedingly flat plateau.

What is claimed is:

1. An amplifier comprising a control tube having an anode, cathode and control grid, an inductive load connected to said anode, a capacitive load including an amplifying device and means to couple said capacitive load to said anode only when said anode voltage departs from a predetermined value in a predetermined sense, said coupling means comprising a unilateral conducting device connected between said anode and said capacitive load, and means to control said predetermined voltage value, means to apply a signal to be amplified to the control grid of said control tube, and means to derive an output from the anode of said control tube.

2. An amplifier as recited in claim 1 wherein said capacitive load includes an integrator tube as said amplifying device and having an anode, cathode and control grid, a feedback diode acting as said unilateral device, a condenser connected in series with said feedback diode, said series connected diode and condenser being connected between the anode and control grid of said integrator tube and also between said control tube anode and said integrator tube control grid.

3. An amplifying system comprising a control tube having an anode, cathode and control grid, an inductive load connected to said anode, a Miller integrator circuit, including means to couple said integrator circuit to said anode only when said anode voltage departs from a predetermined value in a predetermined sense, means to apply a signal to be amplified to the control grid of said control tube, and means to derive an output from the anode of said control tube.

4. An amplifier system comprising a control tube having an anode, control grid and cathode, an inductance connected to said anode, an integrator tube having an anode, control grid and cathode, the anode of said integrator being connected to the anode of said control tube, a diode, a condenser, said diode and condenser being connected in series between the anode and control grid of said integrator tube, means to apply a biasing signal to said diode to establish the voltage at which it will conduct, means to discharge said condenser, means to apply a signal to be amplified to the control grid of said control tube, and means to derive an output from the anode of said control tube.

5. An amplifier, as recited in claim 4 wherein said means to apply a biasing signal to said diode includes a cathode follower tube having anode, cathode, and control grid, means to connect said diode to said cathode follower cathode, a cathode load resistor connected to said cathode follower cathode, and adjustable means to apply a voltage to said cathode follower control grid to establish the voltage at said cathode follower cathode at a desired level.

6. An amplifier as recited in claim 5 wherein said means to discharge said condenser includes a diode connected from one side of said condenser to one end of said cathode load resistor, the other end of said cathode load resistor being connected to the other side of said condenser and to said cathode follower cathode.

7. An amplification system comprising a control tube having an anode, cathode and control grid, an inductive load connected to said control tube anode, means to apply signals to be amplified to said control grid, means to apply a bias to said control tube to maintain said control tube conducting in the absence of said signals, an integrator tube having anode, cathode and control grid, said integrator tube anode being connected to said control tube anode, a feedback diode having a cathode and an anode, a condenser connected between said integrator control grid and the cathode of said diode, the anode of said diode being connected to said control tube anode, means to bias said integrator tube to be non-conducting in the absence of said signals, means to discharge said condenser, means to apply a biasing voltage to the cathode of said feedback diode to maintain it non-conducting until the voltage on said control tube anode exceeds a predetermined level, and means to derive an output from said control tube anode.

8. An amplification system as recited in claim 7 wherein said means to apply a biasing voltage to said diode includes a cathode follower tube having anode, cathode and control grid electrodes, a cathode load resistor connected to said cathode follower cathode, said diode cathode being connected to said cathode follower cathode, a pair of biasing tubes each having cathode, anode and control grid electrodes, the anodes of said biasing tubes being connected to the anode of said cathode follower tube, a separate cathode load resistor connected to the cathode of each of said biasing tubes, a potentiometer including a fixed resistance, and a slider, said fixed resistance being connected between the cathodes of said biasing tubes, said slider being connected to the control grid of said cathode follower tube, means to apply a separate bias to the control grid of each biasing tube to maintain the voltages at their respective cathodes at the limits of the desired bias range for said diode.

9. An amplification system as recited in claim 7 wherein said means to derive an output from said control tube comprises an output cathode follower tube and an output tube each having an anode, cathode, and control grid, the control grid of said output cathode follower tube being connected to the anode of said control tube, a cathode load resistor connected to said output cathode follower cathode, means coupling the control grid of said output tube to the cathode of said output cathode follower, and an output load connected in the anode circuit of said output tube.

10. An amplification system as recited in claim 7 wherein there is included a gate tube having an anode, cathode and control grid, the anode of said gate tube being connected to the anode of said control tube, and means to apply inhibiting signals to said gate tube control grid to inhibit the effect of the application of signals to be amplified to said control tube control grid.

11. An amplifier comprising a control device having an anode, a cathode, and a control element, an anode-to-cathode load circuit for said device having terminals for applying voltages from a direct current source, said load circuit having two branches, one branch including an inductive load, and the other branch including a capacitive load comprising a series circuit having a unilateral conducting device and a capacitor connected in series, an amplifying device having input and output terminals, said series circuit being also connected between said amplifying device output terminal and said amplifying device input terminal, and means to bias said unilateral conducting device.

12. An amplifier comprising a control device having an anode, a cathode and a control element, an anode load circuit having terminals for applying voltages from a direct current source, said load circuit having two branches including, respectively, an inductive load and a capacitive load including a capacitor and a unilateral conducting device connected between said anode and said capacitor, an amplifying device connected to said capacitor to enhance the capacity effect of said capacitor, and means to bias said unilateral conducting device.

References Cited in the file of this patent

UNITED STATES PATENTS

| | | |
|---|---|---|
| 2,204,089 | Landon | June 11, 1940 |
| 2,273,193 | Heising | Feb. 17, 1942 |
| 2,404,099 | Schade | July 16, 1946 |
| 2,433,342 | Chatterjea et al. | Dec. 30, 1947 |